United States Patent [19]

Hoffman et al.

[11] 4,356,813

[45] Nov. 2, 1982

[54] SOLAR ENERGY CONCENTRATION DEVICE

[76] Inventors: Thomas J. Hoffman, 873 Dorset Dr., Knoxville, Tenn. 37923; Jose G. Martin, 85 Mansur St., Lowell, Mass. 01852

[21] Appl. No.: 230,526

[22] Filed: Feb. 2, 1981

[51] Int. Cl.³ .............................................. F24J 3/02
[52] U.S. Cl. ................................. 126/439; 126/441; 350/288
[58] Field of Search ............... 126/440, 438, 439, 417, 126/441, 450, 451; 350/288, 299

[56] References Cited

U.S. PATENT DOCUMENTS

| 895,761 | 8/1908 | Huntoon | 126/440 |
|---|---|---|---|
| 3,869,199 | 3/1975 | Cummings | 126/440 |
| 3,896,786 | 7/1975 | Clevett | 126/541 |
| 3,899,672 | 8/1975 | Levi-Setti | 126/439 |
| 4,018,211 | 4/1977 | Barr | 126/439 |
| 4,043,315 | 8/1977 | Cooper | 126/440 |
| 4,049,195 | 9/1977 | Rugenstein | 126/422 |
| 4,080,221 | 3/1978 | Manelas | 126/248 |
| 4,106,479 | 8/1978 | Rogers | 126/439 |
| 4,108,158 | 8/1978 | Kracklauer | 126/438 |
| 4,114,592 | 9/1978 | Winston | 126/439 |
| 4,166,769 | 9/1979 | Dukess | 126/440 |
| 4,192,289 | 3/1980 | Clark | 126/438 |
| 4,299,201 | 11/1981 | Tsubota | 126/440 |
| 4,305,383 | 12/1981 | Bloxsom | 126/440 |

Primary Examiner—Daniel J. O'Connor
Attorney, Agent, or Firm—Luedeka, Fitch & Neely

[57] ABSTRACT

A solar energy concentrating device for concentrating the intensity of solar radiation impinging on a solar collector includes a plurality of adjacently positioned tapered solar energy passageways having solar energy reflecting walls. These tapered solar energy passageways are disposed in an arcuate array to form a solar energy concentrating device. The convex side of the concentrating device is the outer surface of the concentrating device through which solar energy enters the tapered solar energy passageways, and the concave side of the concentrating device is the inner surface of the concentrating device from which concentrated solar energy emerges from the concentrating device. A solar collector is located to the concave side of the concentrating device so that the concentrated solar energy leaving the concentrating device will impinge on the solar collector.

6 Claims, 6 Drawing Figures

SOLAR ENERGY CONCENTRATION DEVICE

BACKGROUND OF THE INVENTION

The present invention relates generally to a device for collecting solar energy radiation and more particularly to a device for concentrating radiant solar energy for use with a solar collector device.

Solar energy has been long since thought of as a viable source of energy and it is contemplated that its usage will increase in the coming years. Many varied types of devices have been proposed for concentrating and collecting solar energy.

The devices known to us employ, for example, arcuate mirrors behind a solar collector device to reflect and concentrate solar energy back onto the collector, or a lens, such as a Fresnel lens located in front of a solar collector to concentrate solar energy passing through the lens on to the collector.

These devices for concentrating solar energy must be rotated or otherwise moved to follow the daily or seasonal changes in the position of the sun. These devices are often-times quite large in size to provide a large surface for the impingement of solar energy. Of course, the larger the concentrating device, the larger, more powerful and structurally stronger must be the means for supporting and moving the concentrating device.

In addition, these known types of solar concentrating devices are designed so as to concentrate radiation which impinges along a given axis, and they tend to cast a shadow or shade themselves from the solar radiation when the radiation is impinging at large angles with respect to this axis.

SUMMARY OF THE INVENTION

The present invention recognizes these shortcomings of the prior art and provides a relatively inexpensive and practical solution which obviates them.

An object of the invention is to provide a new and useful device for the efficient collection and concentration of solar energy.

A further object is to provide a solar energy concentrator which does not necessarily have to be moved to track the movement of the sun for the efficient collection and concentration of solar energy.

More particularly, the present invention provides a solar energy concentrating device for use with a solar collector which includes a plurality of tapered solar energy channels providing a passageway for solar energy radiation. The walls of each tapered solar energy channel are formed of a solar energy radiation reflecting substance so that solar energy radiation which impinges on these walls will be reflected back into the tapered channel in the direction of the convergence of the tapered channel. The tapered solar energy channels are disposed in an arcuate array and cooperatively define a solar energy concentrating device which has a convex outer surface and a concave inner surface. The tapered solar energy channels are oriented so that they taper in the direction from the convex outer surface toward the concave inner surface of the concentrating device. Solar energy radiation enters the tapered channels through the convex outer surface of the concentrating device and emerges in a concentration from the concave inner surface of the collecting device.

A solar energy collector is to be located to the concave side of the concentrator at a location spaced from the concentrator sufficient to most efficiently receive the concentrated solar energy emerging from the concave surface of the concentrating device.

BRIEF DESCRIPTION OF THE DRAWINGS

For a more complete understanding of the invention reference is made to the following specification and accompanying drawings wherein like numerals refer to like parts throughout the several views, and in which.

DETAILED DESCRIPTION

Figure 1:
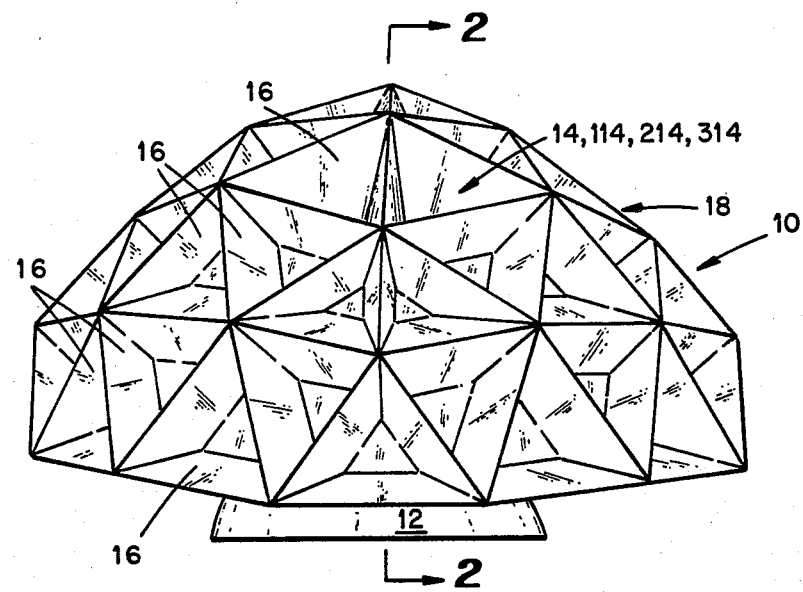
FIG. 1 is a side view of a solar energy concentrating device embodying various features of the present invention.
Figure 2:
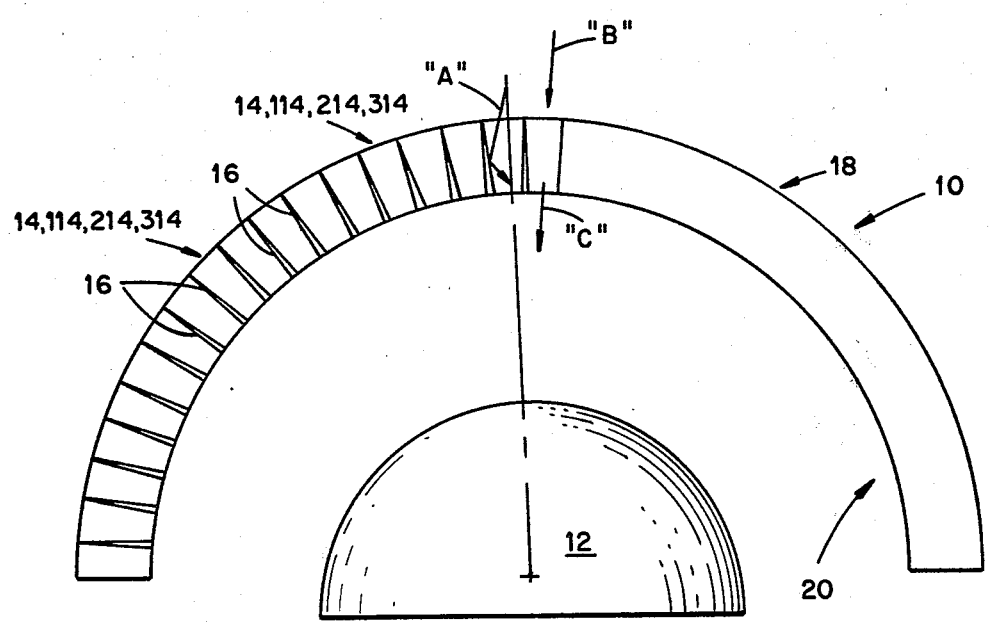
FIG. 2 is a cross-sectional view taken in the direction of arrows 2—2 in FIG. 1.

First, with reference to FIGS. 1 and 2, there is shown a solar energy concentrating device, generally denoted as the numeral 10, for use with a solar collector 12. The solar energy concentrating device 10 concentrates solar radiation to increase the energy per unit area impinging on the solar collector 12.

With additional reference to FIG. 2, the solar energy concentrating device 10 is formed of a plurality of tapered channel means 14, 114, 214, 314 which provides a passageway therethrough for radiant solar energy. The walls 16 of the tapered channel means have radiant energy reflecting properties, such as a mirrored surface, so that any radiant solar energy which impinges on the walls 16 will be reflected back into the interior of the tapered channel means generally in the direction of the convergence of the tapered channel means as depicted by the arrows "A" in FIG. 2.

As can be best seen in FIGS. 1 and 2, the plurality of tapered channel means 14, 114, 214, 314 are disposed closely adjacent one another in an arcuate array and collectively define a three dimensional arcuately shaped solar energy concentrating device 10. The three dimensional arcuate shape is illustrated in FIG. 1, for example, as a hemisphere. However, it is contemplated that other three dimensional arcuate shapes such as a segment of a sphere and a spherical sector, for example, will be advantageously used in geographical locals not requiring the surface area of a hemisphere, for example. Thus, the arcuate solar energy concentrating device has a convex outer surface 18 and a concave inner surface 20. Radiant solar energy enters the tapered channel means through the convex outer surface 18 and concentrated solar energy emerges from the tapered channel means through the concave inner surface 20 of the solar energy concentrating device 10 as depicted by the arrows "B" and "C", respectively, in FIG. 2.

Each of the tapered channel means 14, 114, 214, 314 is oriented with its longitudinal axis lying on a radius of the three dimensional arcuately shaped solar energy concentrating device 10 and is disposed such that it tapers in the direction from the convex outer surface 18 toward the concave inner surface 20 of the solar energy concentrating device 10.

In addition, the angle of the taper of the tapered channel means 14, 114, 214, 314 is such that its walls 16 lie approximately on a radius of the solar energy concentrating device.

Figure 3:
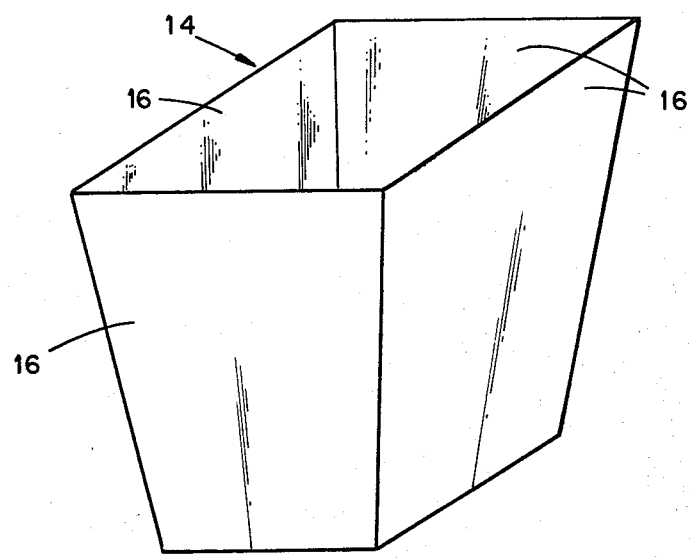
FIG. 3 is an enlarged isometric view of an advantageous embodiment of a component of the invention.

Illustrated in FIG. 3 is one advantageous embodiment of the tapered channel means 14. Here the tapered channel means is in the shape of a truncated rectangular pyramid with the adjacent walls 16 being substantially at right angles to each other. Also, in this embodiment the walls 16 are substantially planar.

Figure 4:
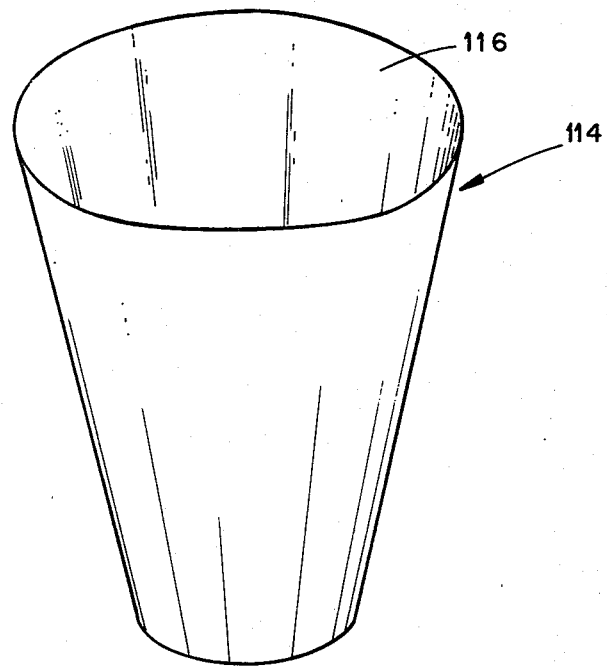
FIG. 4 is an enlarged isometric view of another advantageous embodiment of a component of the invention.

FIG. 4 illustrates another advantageous embodiment of a tapered channel means 114, which is in the shape of a truncated cone.

Figure 5:
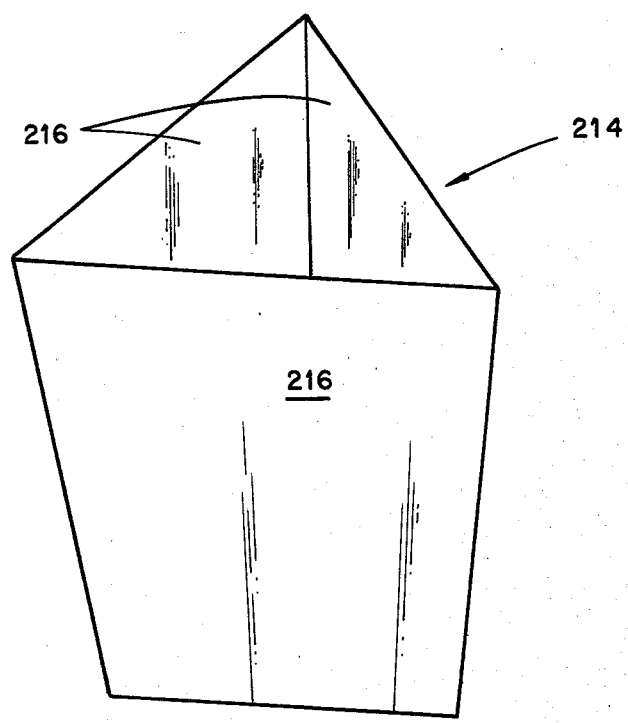
FIG. 5 is an enlarged isometric view of a further advantageous embodiment of a component of the invention; and, FIG. 6 is an enlarged isometric view of yet another advantageous embodiment of a component of the invention.

A further advantageous embodiment of the tapered channel means, denoted in FIG. 5 as the numeral 214, is in the shape of a truncated triangular pyramid with its adjacent walls 216 being at an acute angle to each other. Here also, the walls 216 are substantially planar.

Figure 6:
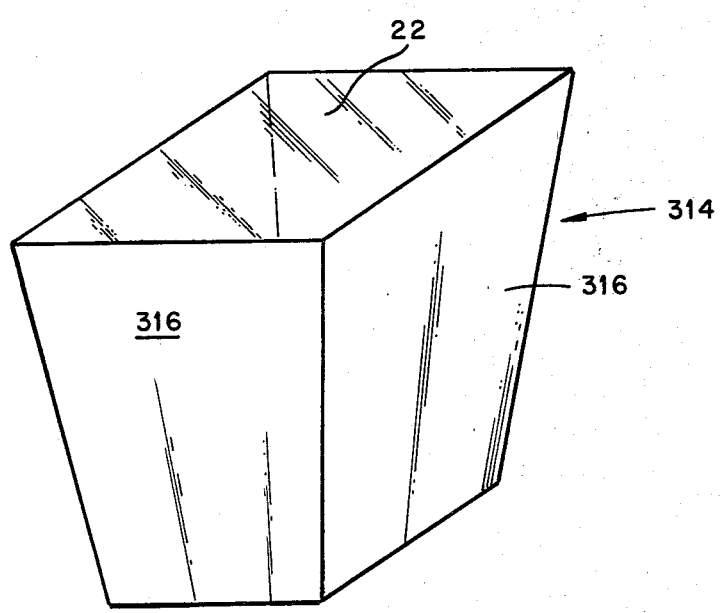

In FIG. 6 yet another advantageous embodiment of a tapered channel means 314 is illustrated. In this embodiment, the tapered channel means 314 is filled with a transparent material having a relatively high index of refraction such as, for example, water or glass. The inclusion of such a refracting material increases the amount of radiant energy passing through the tapered channel means over that which would pass through if the tapered channel means were filled with air. It should be understood that although the tapered channel means 314 is illustrated as being in the shape of a truncated rectangular pyramid, it could also be in the shape of, for example, the truncated conical shape of the tapered channel means 114, or the truncated triangular pyramid shape of the tapered channel means 214 as well.

Preferably the tapered channel means defines a channel which is approximately twice as long as it is wide at its widest point.

As solar energy passes through the tapered channel means in the direction of the convergence of the taper from the convex surface to the concave surface of the concentrating device, the energy per unit area increases.

As can be best seen in FIG. 2, the solar collector 12 is located to the concave side of the solar energy concentrating device 10. Ideally the solar collector should be arcuate to complement the arcuate shape of the concentrator device. In this event, it is presently felt that the radius of the solar collector should be about equal to the product of the radius of the inner surface and radius of the outer surface of the concentrator device divided by the sum of the radius of the inner surface and radius of the outer surface of the concentrator device.

One of the advantages of the solar energy concentrator device 10 is that the concentrator can remain stationary and it is only necessary to rotate the solar collector over the inner concave surface of the concentrator device in order to achieve high heat flux.

Also, due to the symmetry of the concentrator device 10, diffuse as well as direct solar radiation will pass through and be transmitted along the tapered channel means.

In addition to direct and diffuse radiation, there is another type which is neither completely random nor parallel. This type of radiation is that reflected from surfaces having a high albedo such as snow, ice and white sand. The concentrator device 10 can also concentrate this reflected solar radiation.

The concentrator 10 makes it possible to introduce design features which may affect the operating temperature of the collector.

For example, for some solar applications such as solar cells, high costs could, in principle, be overcome by optical concentrators. However, the cells are heated by absorption of solar photons and subsequent pair recombination, and the heating degrades the cell performance. To improve cell efficiency, it may be desirable to enhance heat dissipation. The cells may be mounted on a cooled metal block and the heat from the block may be removed by a cooling fluid flowing along normal pipes or by a heat pipe. In traditional mirror concentrators, however, shading of the mirrors may make such a solution impractical. In the concentrator 10, however, a cooled metal block and the cooling or heating pipes can conveniently be located underneath the cells of the collector and the heat easily removed without crossing the solar ray trajectories.

Alternatively, selected walls 16 of the tapered channel means can be chosen as the mirrored walls to insure optimum conversion and heat dissipation.

For other applications, high concentrator temperatures may be desirable. The outer shell of mirrors of the collector 10 acts as an inhibitor to cooling of a hot collector surface and it is possible to take advantage of this feature to minimize radiation, conduction and convection cooling.

The foregoing detailed description is given primarily for clearness of understanding and no unnecessary limitations should be understood therefrom for modifications will be obvious to those skilled in the art upon reading this disclosure and can be made without departing from the spirit of the invention or the scope of the appended claims.

What is claimed is:

1. A solar energy concentrating device for concentrating the intensity of solar radiation impinging on a solar collector, the solar energy concentrating device comprising:

means defining a tapered truncated pyramidal-shaped channel for the passage therethrough of solar energy, said tapered channel defining means having solar energy reflecting planar walls such that solar energy which may impinge on said walls is reflected back into said tapered channel generally in the direction of the convergence of said tapered channel;

a plurality of said tapered channel defining means being linearly connected to one another in an arcuate array defining a three dimensional arcuately shaped solar energy concentrating device having an outer convex surface through which solar energy enters said tapered channel defining means and an inner concave surface through which concentrated solar energy emerges from said tapered channel defining means to be focused on a collection surface spaced radially inwardly from said inner concave surface; and, said tapered channel defining means are oriented such that they taper in the direction from said convex outer surface toward said concave inner surface of said solar energy concentrating device.

2. The solar energy concentrating device of claim 1, wherein:

the longitudinal axis of each of said tapered channel defining means lies on a radius of said arcuately shaped solar energy concentrator device; and, the walls of said tapered channel defining means lie approximately on a radius of said arcuate solar energy concentrator device.

3. The solar energy concentrating device of claim 1, wherein each of said tapered channel defining means define a channel which is approximately twice as long as it is wide at its widest point.

4. The solar energy concentrating device of claim 1, further comprising a transparent material having a relatively high index of refraction filling each of said tapered channels.

5. The solar energy concentrating device of claim 1, wherein adjacent walls of said tapered channel defining means are at substantially right angles to each other.

6. The solar energy concentrating device of claim 1, wherein said arcuate shape of said solar energy concentrating device is a sector of a sphere.

* * * * *